United States Patent [19]

Suzaki et al.

[11] Patent Number: 4,641,149

[45] Date of Patent: Feb. 3, 1987

[54] THERMAL TRANSFER PRINTER

[75] Inventors: Masafumi Suzaki, Hitachi; Katsumasa Mikami, Nakamachi; Yousuke Nagano; Tomoji Kitagishi, both of Hitachi, all of Japan

[73] Assignee: Hitachi, Ltd., Tokyo, Japan

[21] Appl. No.: 768,319

[22] Filed: Aug. 22, 1985

[30] Foreign Application Priority Data

Aug. 29, 1984 [JP] Japan .................... 59-178351

[51] Int. Cl.$^4$ .................... G01D 15/10

[52] U.S. Cl. .................... 346/76 PH; 346/105; 400/120; 400/229

[58] Field of Search .................... 346/76 PH, 105, 106; 400/120, 224; 214/216 PH

[56] References Cited

FOREIGN PATENT DOCUMENTS 120385 9/1981 Japan .................... 346/76 PH

*Primary Examiner*—Arthur G. Evans

*Attorney, Agent, or Firm*—Antonelli, Terry & Wands

[57] ABSTRACT

In the thermal transfer printer for printing with an ink ribbon in plural columns, a center of a flat portion formed on the platen roller of a contact portion of the thermal head and a center of the thermal head are shifted corresponding to an amount of shift of printing position as against a center of width of the ink ribbon. When the printing position is set above as against the center of width of the ink ribbon, the center of the thermal head is set above width (P) of the flat portion being formed on the platen roller of the contact portion of the thermal head. When the printing position is set below as against the center of width of the ink ribbon, the center of the thermal head is set below width of the flat portion being formed on the platen roller of the contact portion of the thermal head. The present invention can prevent the shifting-up or the shifting-down of the ink ribbon at the thermal head in structure in which the center of the ink ribbon width and the center of the printing shift in the plural columns printing.

8 Claims, 13 Drawing Figures

THERMAL TRANSFER PRINTER

BACKGROUND OF THE INVENTION

This invention relates to a thermal transfer printer, and, more particularly, to a thermal transfer printer in printing with the ink ribbon in plural columns at align winding of the ink ribbon.

A disadvantage of an ink ribbon used in a conventional thermal transfer printer resides in the fact that, because ink of the ink ribbon is completely transferred to a thermal transfer printing paper in only one printing and can not be reused, the ink ribbon increases the overall operational costs of the printer.

To avoid the above noted disadvantage, a thermal transfer printer is proposed in Japanese Utility Model Laid-Open No. 194042/1983. Wherein the thermal transfer printer has a reversing mechanism for reversing a driving direction of an ink ribbon and also a vertical movement mechanism for a thermal head whereby it is possible to print in both the forward and backward directions with two columns, that is, upper and lower tracks of the ink ribbon. However, this thermal transfer printer becomes structurally complex because both a reversing mechanism of the ink ribbon and the vertical movement mechanism of the thermal head are necessary.

Furthermore, to reciprocatingly print, the moving distances of the ink ribbon to go and return must be equal, so the ink ribbon can not stop moving in the space not to print in the same one line of the ink ribbon, and such fact is not economical in considering a consumption of the ink ribbon.

So, when printing of the thermal transfer printer is carried out in a pair of upper and lower columns of the ink ribbon only by the reverse mechanism of the ribbon cassette without both the reverse mechanism in driving direction of the ink ribbon and the vertical movement mechanism of the thermal head, etc. in the thermal transfer printer itself, the thermal transfer printer can print the same method as a unidirectional printing method.

And effective length of used ink ribbon in the thermal transfer printer can be twice of previous one, so that a lower operating cost can be realized by the user of the thermal transfer printer.

However, there are no documents about the techniques for the ink ribbon winding of the thermal transfer printer in a regular or aligned state under the conditions of shifting down or shifting up in the ink ribbon, and that is important problem in the case of printing in plural columns such as upper and lower two columns using same one ink ribbon.

An object of the present invention is to provide a thermal transfer printer for printing in plural columns with one ink ribbon wherein the shift-up or shift-down of the ink ribbon at a thermal head can be prevented.

An another object of the present invention is to provide a thermal transfer printer for printing in plural columns with one ink ribbon wherein winding of the ink ribbon can be carried out in an aligned raw.

A further object of the present invention is to provide a thermal transfer printer for printing in plural columns with one ink ribbon wherein winding load of the ink ribbon can be decreased.

A still further object of the present invention is to provide a thermal transfer printer for printing in plural columns with one ink ribbon wherein wind-uncapable accidents of the ink ribbon can be prevented.

Yet another object of the present invention is to provide a thermal transfer printer for printing in plural columns with one ink ribbon wherein winding tension of the ink ribbon can be made small.

According to the present invention, a thermal transfer printer is provided which includes a thermal head, a platen roller pressed against the thermal head through a thermal transfer printing paper, a carriage mounted with the thermal head and a ribbon cassette and transversely moving along the platen roller, and an ink ribbon having plural columns and being received within the ribbon cassette. A center of a flat portion is formed on the platen roller of a contact portion of the thermal head and a center of the thermal head are shifted corresponding to an amount of shift of printing position as against a center of width of the ink ribbon.

The thermal transfer printer of the present invention provides a structure wherein the center of the thermal head is set above a width of the flat portion formed on the platen roller of the contact portion of the thermal head, when the printing position is set above as against the center of width of the ink ribbon, or a structure of the center of the thermal head is set below width of the flat portion being formed on the platen roller of the contact portion of the thermal head, when the printing position is set below as against the center of width of the ink ribbon.

The present invention can prevent the shift-up or the shift-down of the ink ribbon at the thermal head in structure in which the center of the ink ribbon width and the center of the printing shift in the plural columns printing.

Only the central part of the ink ribbon is used for printing in the conventional thermal transfer printer. On the other hand, when the structure of the thermal transfer printer for printing in plural columns, such as upper and lower columns, with one ink ribbon is used for smaller consumption of the ink ribbon, the following technical problems arise.

In the conventional thermal transfer printers, the center of one ink ribbon is printed, but in the case of plural columns printing, such as upper and lower columns, printing the center of ink ribbon width and the center of printing are not coincident. Consequently the stress distribution acted on the ink ribbon in the running ink ribbon differs at upper and lower parts of the ink ribbon, so a rising (shifting up) phenomena or a sinking (shifting down) phenomena of the ink ribbon at the thermal head is occurred.

BRIEF DESCRIPTIONS OF THE DRAWINGS

DETAILED DESCRIPTION

Figure 1:
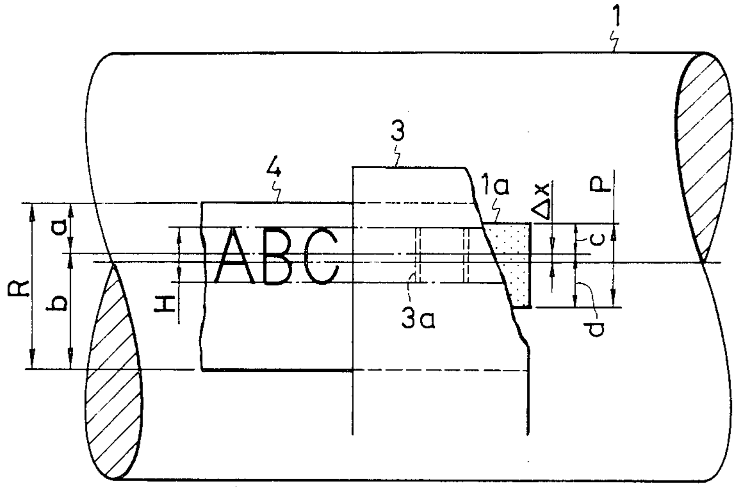
FIG. 1 is a rear side view depicting a relationship between a platen roller, a thermal head and printing position of an ink ribbon of 0-a thermal head constructed in accordance with one embodiment of a thermal transfer printer of the present invention.

Referring now to the drawings when like reference numerals are used throughout the various views to designate like parts, and, more particularly, to FIGS. 7–11, which are provided so as to explain the rising or shifting up phenomena or a sinking shifting down phenomena of an ink ribbon at a thermal head, a showing of these figures, a thermal head 3 presses in perpendicularly to an ink ribbon 4, normally to a rubber platen roller 1 around which is wound a thermal transfer printing paper 2. The pressing pressure of the thermal head 3, the hardness of the rubber platen roller 1, and a width of the thermal head 3, etc., are usually determined so that a width size P of the contact part of the thermal head 3 on the platen roller 1 is slightly larger than a width size H of exothermic resistance element 3*a* on the thermal head 3. A width R of the ink ribbon 4 is determined to print upper and lower divisions with the ink ribbon 4.

Figure 7:
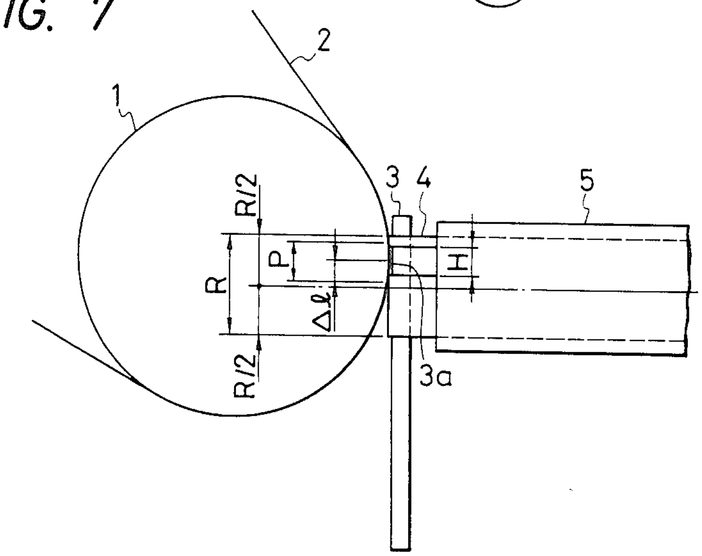
FIG. 7 is a side view normal to the platen roller axis depicting the position of the ink ribbon and the position of the printing.

FIG. 7 provides an example of a printing only by an upper half of an ink ribbon 4 and, after a printing in the upper half of the ink ribbon 4, a ribbon cassette 5 is reversed to put the top side down and a half of the ink ribbon, that is, the unused half, is used to effect a printing transfer. In this manner, the center of the width R of the ink ribbon 4 shifts by $\Delta l$ from the printing center as shown in FIG. 7.

Figure 8:
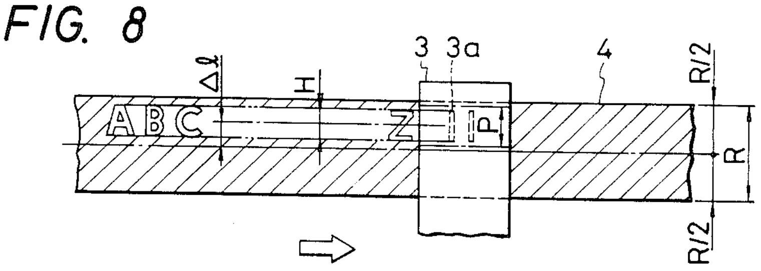
FIG. 8 is a plan view from the back side of the thermal head showing the upper and the lower columns printing.

FIG. 8 schematically illustrates the manner in which the thermal head 3 transfers to the right, in the direction of the arrow, with the upper half of the ink ribbon 4. In FIG. 8, the diagonally cross-sectioned part of the ink ribbon 4 represents the unused portions of the ink ribbon and the white or uncross hatch portion illustrates the used parts of the ink ribbon 4 after a printing.

Figure 9:
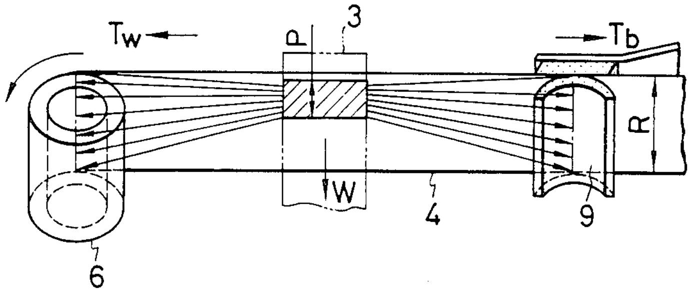
FIG. 9 is a schematic view showing the ink ribbon tension in FIG. 8.

FIG. 9 provides an illustration of a stress distribution in an ink ribbon 4. The thermal head 3 presses only the upper part of the ink ribbon 4, i.e., the diagonally portion in FIG. 9. In this condition, the winding tension $T_w$ works in a direction of the arrow to wind with a ribbon take-up core 6 within a ribbon cassette 5. And then the tension $T_b$ is worked by a back tension adding part 9 to move, with high stability, the ink ribbon 4 to an opposite direction through the thermal head 3.

The stress distribution in the ink ribbon 4 becomes non-uniform as shown by the arrow in FIG. 9 and the tension working to lower a part of the ink ribbon 4 increases and becomes larger than that of the upper part of the ink ribbon 4. Because the winding tension $T_w$ and the back tension $T_b$ tend to distribute uniformly from the upper to the lower part of all of the ink ribbon width R, the ink ribbon 4 pressing position of the thermal head 3 leans to the upper part and, as a result thereof, the force W pressing the ink ribbon 4 a downward direction arises at the ink ribbon 4.

Figure 10:
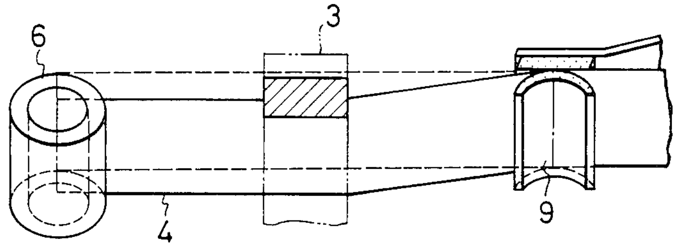
FIG. 10 is a schematic view showing shifting-down of the ink ribbon in FIG. 9.

As shown in FIG. 10, the ink ribbon 4 tends to go down at the thermal head 3. Since the ink ribbon 4 is made of a very thin base film of about 4–8 μm thickness, the ink ribbon 4 itself is not rigid and, therefore, the ink ribbon 4, which is shifted down from the right position of the thermal head 3, has no ability to return to the right position by itself and is wound by the ribbon take-up core 6 under a shifting down condition.

Figure 11:
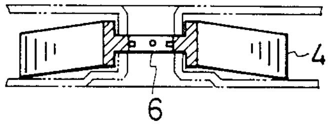
FIG. 11 is a schematic view showing the wind condition of the ink ribbon in the ribbon cassette.

As described above, if the ink ribbon 4 is wound under the condition of a shifting down such as shown in FIG. 11, the ink ribbon 4 is not wound by the ribbon take-up core 6 in one line, but touches the inner wall of the ribbon cassette 5 to receive the ink ribbon 4 and cannot be wound in the ribbon cassette 5.

As noted above, an inconvenient shifting down phenomena occurs at the thermal head 3 in the case of printing with the upper half of the ink ribbon 4. On the other hand, in the case of a printing with the lower half of the ink ribbon 4, it is clear that the similar inconvenient shifting-up phenomena occurs. Moreover, the phenomena of shifting up or shifting down produces additional inconvenient problems different from the winding incapability of the ribbon into the cassette. The latitude or permissible level of shifting up and shifting down with one ink ribbon 4 is less in the situation of printing in plural columns, for example, upper and lower columns, than printing with a center of the ink ribbon 4. Consequently, when a shifting-up and a shifting-down phenomena occur at the thermal head 3, malfunctions or defects may occur such as, for example, the printing may not be carried out. Since the ink ribbon 4 slips out of the exothermic resistance element 3*a* on the thermal head 3 or the exothermic resistance element 3*a* is once again placed on a one-side trace where no ink is provided, no printing is carried out.

It is noted above, it is indispensible to prevent a shifting-up and shifting-down of the ink ribbon 4 in order to enable the construction of a thermal printer for printing in plural columns, i.e., in upper and lower columns, of the ink ribbon 4 in addition to lower the operating costs of the thermal printer.

Figure 2:
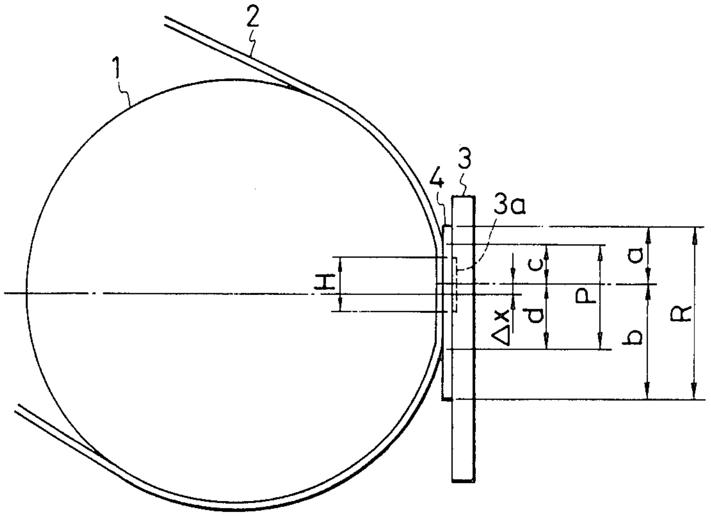
FIG. 2 is a side view normal to the platen roller axis in FIG. 1.

As shown in FIGS. 1 and 2, in accordance with the present invention, an ink ribbon 4 has a width R which is wider than twice of height H of the exothermic resistance element 3*a* of the thermal head 3, i.e. height of printing letters to be able to print two columns with in one ink ribbon 4. A relationship between the position of the thermal head 3 and the position of the exothermic resistance element 3*a* is determined to print with the upper half of the ink ribbon 4. Namely, when distances from the center of the exothermic resistance element 3*a* of the thermal head 3 to the upper and the lower edges of the ink ribbon 4 are a and b respectively, b is longer than a, that is, $b > a$.

When the relationship between the ink ribbon 4 and the thermal head 3 is determined as above, the force, which shifts the ink ribbon 4 down occurs by virtue of the relationship illustrated in FIG. 9.

Next, relationship between the position of the thermal head 3 and the position of the platen roller 1. As shown FIG. 2, when the thermal head 3 presses the platen roller 1 through the ink ribbon 4 and the thermal transfer printing paper 2, a width of flat plane 1a formed on the surface of the platen roller 1 to be P. So as not let both the centers of the exothermic resistance element 3a on the thermal head 3 and flat plate plane 1a of the platen roller 1 meet each other, the thermal head 3 is shifted by $\Delta x$ as shown in in FIG. 2.

This is, when the distances from the center of the exothermic resistance element 3a on the thermal head 3 to the upper edge and the lower edge of the flat plate plane 1a of the platen roller 1 are c and d respectively, the relationship of the position of the thermal head 3 and the position of the platen roller 1 is determined to be $d>c$.

In such a structure of the thermal transfer printer, running resistance of the ink ribbon 4 is also larger in the lower flat plane c than the upper flat plane d. Because to the printing center i.e. the thermal head center, the lower flat plane size d is larger than the upper flat plane size c; $d>c$. Therefore, the force, that shifts the ink ribbon 4 in an upward direction, acts as explained in connection with FIG. 13.

As the result, the force shifts the ink ribbon 4 downward because of running-up of the printing position of the ink ribbon 4 balances with the force. The force shifts the ink ribbon 4 upward because of increasing of the flat plane area of downside. So that the ink ribbon 4 can be run without shifting-up and shifting-down of the ink ribbon 4. It has been experimentally determined that the printing position of the ink ribbon 4 and the position of the thermal head 3 to the platen roller 1 has the following relationship: $b:a=d:c$.

Namely, when a non-uniform tension distribution caused by the shift of the printing position of the ink ribbon 4 from the printing center is $K_1$, then $K_1=b/a$. And when a non-uniformity of running resistance caused by the shift of the center of the thermal head 3 from the center of the platen flat plane 1a is $K_2$, then $K_2=c/d$. When a non-uniformity of the tension $K_1$ and running resistance $K_2$ are equal, stable running of the ink ribbon 4 can be obtained.

In this embodiment, the case of print of the upper ink ribbon 4 is described, but on the contrary it is clear that the center of the thermal head 3 can be shifted down from the center of the flat plate plane 1a.

In above structure, not only shifting-up and shifting-down of the ink ribbon 4 but also wind-incapable accident of the ink ribbon 4 and partial printing by the shifting-up or the shifting-down of the ink ribbon 4 can be prevented by very simple structure on printing in the plural columns, such as two columns i.e. upper and lower columns of one ink ribbon 4.

Figure 3:
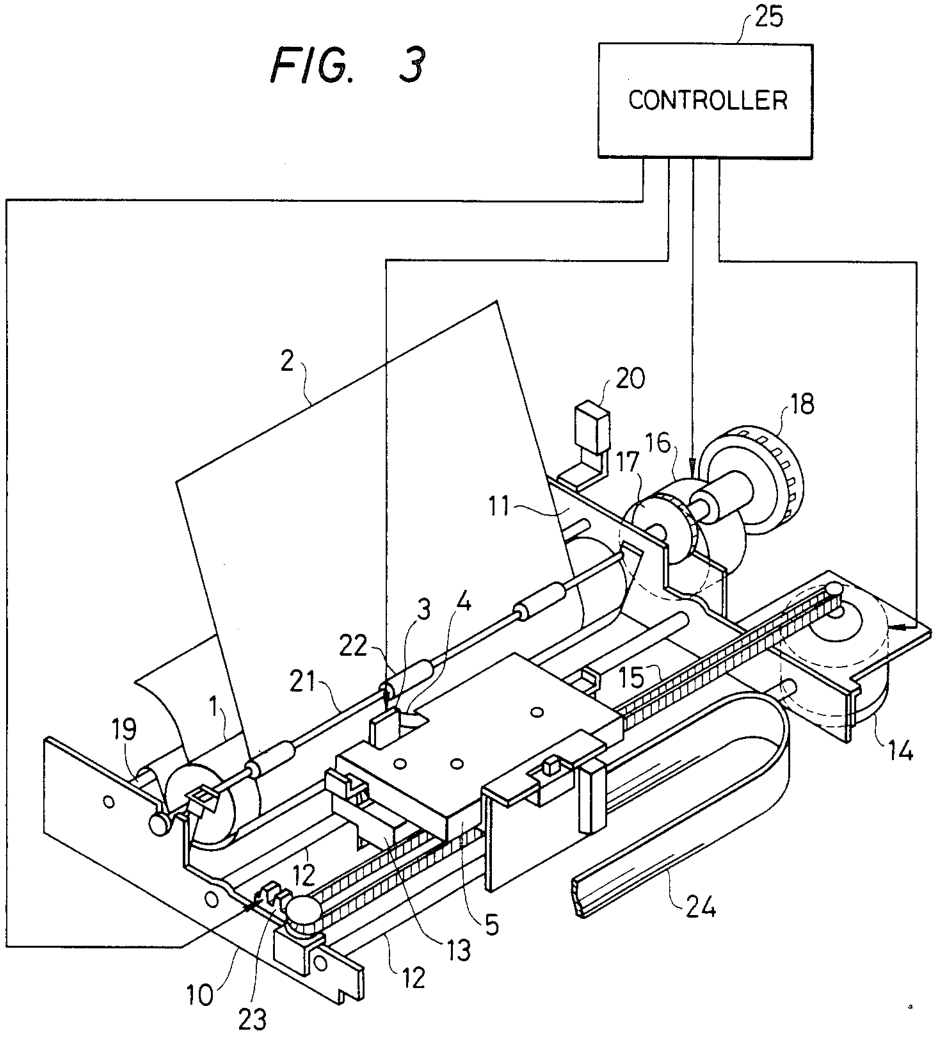
FIG. 3 is a perspective view of one embodiment of the thermal transfer printer of the present invention.

As shown in FIG. 3, a thermal transfer printer includes shaft 12 fixed between sides plates 10 and 11 with carriage 13 being slidably disposed on the shaft 12. A ribbon cassette 5 and a thermal head 3 are detachably mounted on the carriage 13, and an ink ribbon 4, applying solid ink on a surface thereof, is received within a ribbon cassette 5.

In FIG. 3, the carriage 13 can move to the rightward and leftward directions by a carriage motor 14 through a timing belt 15 with driving power being transmitted to a gear 17 fixed on a shaft 21 of a platen roller 1 by a line feed motor 16 and then a thermal transfer printing paper 2 is advanced.

The thermal transfer printing paper 2 can be advanced when a platen knob 18 is turned by hand. A paper guide 19 is disposed in back portion of the platen roller 1. A paper pressing roller 22 moving along the shaft 21 can press or release the thermal transfer printing paper 2 when a release lever 20 is moved back and forth.

A home position sensor 23 is disposed on the side plate 10. A flat cable 24, mounted on a socket of the thermal head 3, is employed to supply current to the thermal head 3 and other electrical means.

The carriage motor 14, the line feed motor 16, the home position sensor 23, the thermal head 3 and a ribbon sensor 32 for detecting the ink ribbon 4 end etc. are respectively controlled by a CPU relating to a controller 25.

The thermal transfer printer is made in the manner that printing is done when the carriage 13 is moving from the leftward to the rightward, i.e. uni-direction printing method. The ink ribbon 4 is wound when the carriage 13 moves in the rightward direction, and the ink ribbon 4 is not wound when the carriage 13 moves in the leftward direction.

The ribbon cassette 5 comprises an upper cassette case 7 and a lower cassette case 8, with the ribbon cassette 5 being formed as hollow case type having the upper cassette case 7 and the lower cassette case 8 fixed by fastener such as screws.

The ink ribbon 4 and back tension-adding devices 9 and 36, for giving the tension to the ink ribbon 4, are disposed inside the ribbon cassette 5. In the upper cassette case 7 and the lower cassette case 8, notches 42, 43 are provided for enabling an insertion of the thermal head 3 which is put in the carriage 13.

A ribbon take-up core 6 is provided within the ribbon cassette 5, and a plurality of projections 6a are provided on the cylindrical inner wall of the ribbon take-up core 6 which engage a ribbon take-up shaft provided in the carriage 13 as described more fully below when the ribbon cassette 5 is settled wholly to the carriage 13.

The ribbon cassette 5 is comprised so as to correspond to the upper and the lower columns printing with the ink ribbon 4. And when the ribbon cassette 5 is settled in the carriage 13, printing with the upper half of the ink ribbon 4 is carried out. Namely, when only the upper half of an used ink ribbon 4 or an unused thermal transfer printing film, which is wound by a ribbon sender core 26, is printed and the ribbon winding is completely wound by the ribbon take-up core 6. And then the ribbon cassette 5 is put up side down wholly and resettled in the carriage 13.

Therefore, the part of the unused lower half of the ink ribbon 4 of the ribbon cassette 5 which is not put up side down yet becomes upside by turning over. And then this part can be printed, and the ribbon take-up core 6 which was used already to wind the ink ribbon 4 is used as the ribon sender core 26 to send the ink ribbon 4 out after turning over.

Inversely, before turning over, the ribbon sender core 26 which was used to send the ink ribbon 4 out is used as the ribbon take-up core 6 and engaged with the ribbon take-up shaft of the carriage 13. Therefore, the ribbon take-up core 6 and the ribbon sender core 26 are manufactured having the same shape.

Figure 5:
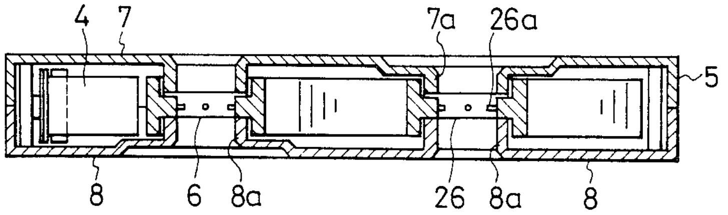
FIG. 5 is a cross sectional view of taken along line V—V in FIG. 4.

The ribbon take-up core 26 and the ribbon sender core 26 are inserted and supported respectively in the very small gap between a boss 8a of the lower cassette case 8 and a boss 7a of the upper cassette case 7 as shown in FIG. 5. And consideration is payed for the position of the ribbon take-up core 6 and the position of the ribbon sender core 26 not to shift vertically by turning over the ribbon cassette 5.

Screw holes 27 are provided with the upper cassette case 7 and the lower cassette case 8 to settle them respectively, and a window is provided on the ribbon cassette 5 to enable a viewing of the rest of the ink ribbon 4 or the transfer printing film wound to the ribbon sender core 26.

Guide rollers 29 and 30 are disposed along the running line of the ink ribbon 4 to determine the position of the running line of the ink ribbon 4 and decrease running resistance during the ink ribbon 4 running. The guide rollers 29 and 30 for turning over the ribbon cassette 5 are positioned nearly symmetrically.

An inlet hole 31 is put on the carriage 13 and is put the ribbon sensor 32 into the ribbon cassette 5 in order to detect the absence of the sending ink ribbon 4, undoing the ink ribbon 4 out of the thermal head 3 by some accidents and missetting of the ribbon cassette 5, etc. The inlet hole 31 is disposed in the upper cassette case 7 for turning over and reusing the ribbon cassette 5.

A guide device 33 of running ink ribbon 4 having two projections 33*a* and 33*b* is provided with the lower cassette case 8 and touches the ink ribbon 4 only at two projections 33*a* and 33*b* to decrease running resistance of the ink ribbon 4. Projections 33*a* and 33*b* are positioned nearly symmetrically to turning over for reusing the ribbon cassette 5.

Ribbon position guides 34 and 35 are provided with the lower cassette case 8 to prevent missrunning of the ribbon sensor 32 when the ink ribbon 4 is loose at starting and ending points or by pressing and pulling of the thermal head 3 to the platen roller 1. When the ink ribbon 4 starts running and the thermal head 3 moves for contact with the platen roller 1, the longer amount of the ink ribbon 4 is supplied out of the ribbon sender core 26 in comparison with normal running. Because the thermal head 3 pulls out the ink ribbon 4 at high speed and the ribbon sender core 26 overturns by it inertia.

Therefore, the ink ribbon 4 becomes slacken because the wound quantity by the ribbon take-up core 6 does not correspond to the supplied quantity. Such slack arises between the ribbon sender core 26 and the back tension-adding device 9. The ribbon sensor 32 is settled at the position which slack of the ink ribbon 4 does not arise, i.e. the position between the back tension-adding device 9 and the thermal head 3 on the ribbon-running line.

Figure 6:
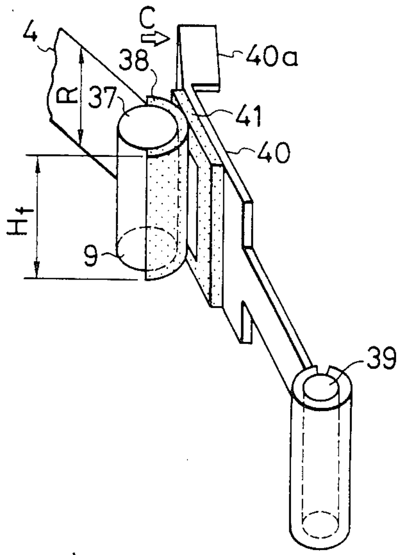
FIG. 6 is a perspective view showing a back tension-adding device in FIG. 4.

As shown in FIG. 6, in the back tension-adding device 9, a friction material 38 of felt or the other materials is provided on the outer wall of a post 37 which is integrally provided with the lower cassette case 8. A plate spring 40 is sticked about a shaft of a post 39. Another friction material 41 of felt or the other materials is disposed on the flat plane of the plate spring 40. The ink ribbon 4 is sandwiched between the friction materials 38 and 41. Widths $H_f$ of the friction materials 38 and 41 are determined to be wider than width R of the ink ribbon 4.

Using the above structure, the shift of position of the ink ribbon 4 at the back tension-adding device 9 can be prevented, because places contacted by the friction material 38 or 41 are provided at both edges and the places act as resistance of the shift of the ink ribbon 4 against vertical shift of the ink ribbon 4.

A projected pin-contacting part 40*a* is integrally provided with the plate spring 40 and acts to release the pressure of the friction material 38 and then back tension when this part is pressed out in the direction of the arrow direction C in FIG. 6. The projected pin-contacting part 40*a* contacts the outer circumference of a projected pin of the carriage 13 and the back tension is released when the ribbon cassette 5 is put in the carriage 13.

Figure 4:
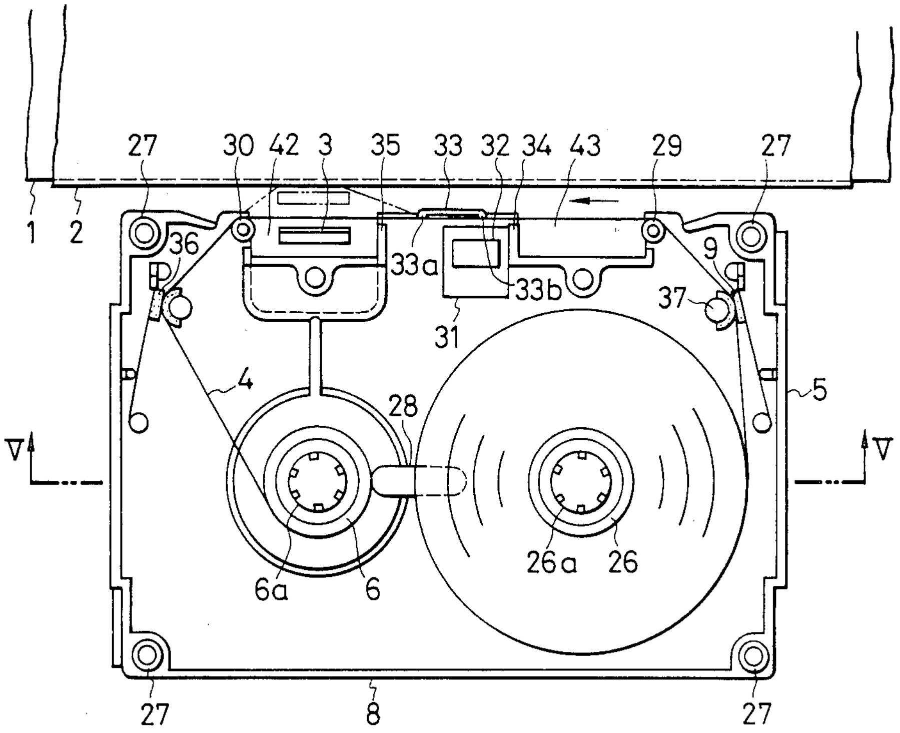
FIG. 4 is a plan view of a ribbon cassette constructed in accordance with the present invention with an upper cassette part removed.

The projected pin of the carriage 13 is settled at the position where the back tension at the back tension-adding device 36 of the wind side is released. Therefore, in FIG. 4, the back tension at the back tension-adding device 9 of the sender side acts to the ink ribbon 4 but at the back tension-adding device 36 of the winder side is released.

When the ribbon cassette 5 is settled on the carriage 13 using the projected pin of the carriage 13 in condition that the same back tension is added to the back tension-adding device 9 or 36 selectively making distinction by in the case of the sending-out of the ink ribbon 4 or the winding-in of the ink ribbon 4 after turned over, the ink ribbon 4 can steadily run. Because only the back tension of the sender side acts and the back tension becomes same in the both cases of the sending-out of the ink ribbon 4 and the winding-in of the ink ribbon 4 after turned over.

In the running process of the ink ribbon 4 provided with above ribbon cassette structure, the ink ribbon 4, supplied out of the ribbon sender core 26, is wound into the ribbon take-up core 6 in sequence through the back tension-adding device 9, the guide roller 29, the running ribbon guide 33, the thermal head 3, the guide roller 30, and the back tension-adding device 36.

Figure 12:
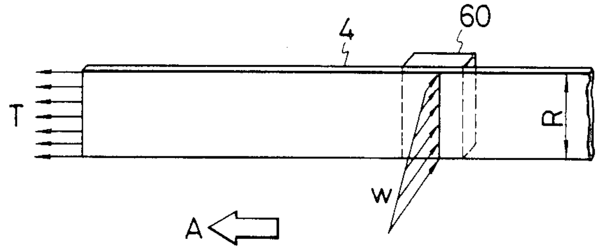
FIG. 12 is a schematical diagram showing that the ink ribbon running against a non-uniform running resistance.

To avoid the problems encountered in the prior art, according to the present invention, it is considered that the ink ribbon 4 moves in the direction of the arrow A in FIG. 12 by the tensile stress T of the ink ribbon 4 to which a running resistance is given from a running resistance device 60. The running resistance device 60 is provided with a pressing part of the thermal head 3 to be platen roller 1. When the pressures w working on the ink ribbon 4 from the running resistance device 60 are not equal at the upper and lower parts of the ink ribbon, then the ink ribbon 4 moves to the direction of the lower pressure.

Figure 13:
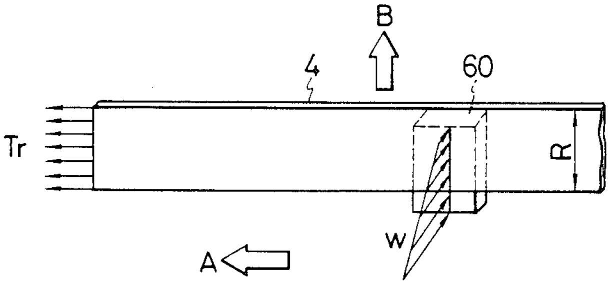
FIG. 13 is a schematic view showing the shifting in FIG. 12.

Namely, as the pressure w on the upper part of the ink ribbon 4 is relatively small as shown in FIG. 13, the ink ribbon 4 shifts up to a low pressure region, i.e., the direction of the arrow B. The shifting-up or shifting-down forces work on the ink ribbon 4 because of a movement of the printing position of the ink ribbon 4 to the upper or lower portion thereof.

By taking into account the above factors, the distance from the upper and lower edges of the flat plane width of the platen roller 1 to the center of the thermal head 3, i.e., the center of printing, is made non-uniform, so as to shift both the centers of the thermal head 3 and the flat plane width of the platen roller 1. That is, the position of the thermal head 3 is determined to make running resistances of the upper and lower regions to the center of the thermal head 3, i.e., the center of printing, and the shifting-up and the shifting-down of the ink ribbon 4 is prevented. Thus, by virtue of the present invention, printing with plural columns, i.e., upper and lower columns with an ink ribbon 4 is readily carried out in a simple and inexpensive manner.

The above embodiments of the present invention can prevent the shift-up or the shift-down of the ink ribbon at the thermal head in structures in which the centers of the ink ribbon width and the printing shift in the upper and the lower columns printing, so following advantageous effects can be obtained.

More particularly, since two columns printing i.e. upper and lower columns printing in one ink ribbon can be made, the service life of the ink ribbon increases and the operating cost of the thermal transfer printer can be significantly deceased.

Moreover, with almost same structure as a conventional thermal transfer printer printer providing a single printing, the life time of the ink ribbon can be increased.

Additionally plural columns printing, an extra width of the ink ribbon can be small and partial printing can be prevented.

Furthermore, as winding of the ink ribbon in an aligned row can be carried out, the winding load decreases, the wind-uncapable accidents are prevented, the ink ribbon wind tension can be made small, and the size of the carriage can be made small.

What is claimed is:

1. A thermal transfer printer comprising a thermal head, a platen roller being pressed against said thermal head through a thermal transfer printing paper, a carriage mounted with said thermal head and a ribbon cassette and transversely moving along said platen roller, and an ink ribbon having plural columns and being received within said ribbon cassette characterized in that a center of a flat portion being formed on said platen roller of a contact portion of said thermal head and a center of said thermal head are shifted corresponding to an amount of a shift of printing position as against a center of a width of said ink ribbon.

2. A thermal transfer printer according to claim 1, characterized in that the center of said thermal head is set above a center of a width of the flat portion formed on said platen roller of the contact portion of said thermal head, when the printing position is set above as against the center of width of said ink ribbon, thereby preventing a shift-down of said ink ribbon at said thermal head.

3. A thermal transfer printer according to claim 1, characterized in that the center of said thermal head is set below a center of a width of the flat portion formed on said platen roller of the contact portion of said thermal head, when the printing position is set below as against the center of width of said ink ribbon, thereby preventing a shift-up of said ink ribbon at said thermal head.

4. A thermal transfer printer according to claim 1, characterized in that the printing position and the contact portion of said thermal head are set with said ink ribbon and said platen roller respectively, so as to equal a ratio of a distance from the center of said thermal head to an upper edge of said ink ribbon and distance from the center of said thermal head to a lower edge of said ink ribbon and to a ratio of distance from the center of said thermal head to an upper edge of the flat portion being formed on said platen roller and distance from the center of said thermal head to a lower edge of the flat portion being formed on said platen roller.

5. A thermal transfer printer according to claim 4, characterized in that the printing position of said ink ribbon and the position of said thermal head to said platen roller are set in a condition such that the ratio of the distance from the center of said thermal head to the upper edge of said ink ribbon and the distance from the center of said thermal head to the lower edge of said ink ribbon is equal to the ratio of the distance from the center of said thermal head to the upper edge of flat portion being formed on said platen roller and the distance from the center of said thermal head to the lower edge of the flat portion formed on said platen roller.

6. A thermal transfer printer comprising a thermal head, a platen roller being pressed against said thermal head through a thermal transfer printing paper, a carriage mounted with said thermal head in a ribbon cassette and transversely moving along said platen roller, an ink ribbon having plural columns and being received within said ribbon cassette, a ribbon take-up core means and a ribbon sender core means provided within said ribbon cassette, and said ribbon take-up core means and said ribbon sender core means have the same shape, characterized in that:

a center of a flat portion formed on said platen roller of a contact portion of said thermal head and a center of said thermal head are shifted corresponding to an amount of a shift of printing position as against a center width of said ink ribbon, whereby a shift-up or a shift-down of said ink ribbon at said thermal head is prevented.

7. A thermal transfer printer according to claim 6, characterized in that:

said ink ribbon has two columns, when one column of said ink ribbon is printed and completely wound by said ribbon take-up core means, said ribbon cassette is put upside down and reset in said carriage, whereby another column of said ink ribbon is printed, and said ribbon take-up core means is used as said ribbon sender core means to supply said ink ribbon.

8. A thermal transfer printer according to claim 7, characterized in that:

said another column of said ink ribbon reset in said carriage in printed in the same printing direction as the printing direction of said one column of said ink ribbon.

* * * * *